(12) United States Patent
Wolf et al.

(10) Patent No.: US 7,531,015 B2
(45) Date of Patent: *May 12, 2009

(54) SYSTEM FOR CONVERTING FUEL AND AIR INTO REFORMATE

(75) Inventors: Felix Wolf, Augsburg (DE); Christian Baecker, Fuerstenfeldbruck (DE); Sybille Miklos, Tutzing (DE); Christine Sallinger, Unterschleissheim (DE); Marcus Neumueller, Hechendorf (DE); Stefan Kunz, Munich (DE); Martin Wegner, Neubrandenburg (DE); Florian Metz, Mering (DE); Bernd Mittmann, Germering (DE); Johann Sperl, Penzberg (DE); Thomas Kerscher, Munich (DE); Josef Amann, Bad Goegging (DE)

(73) Assignee: Webasto AG, Stockdorf (DE)

( * ) Notice: Subject to any disclaimer, the term of this patent is extended or adjusted under 35 U.S.C. 154(b) by 296 days.

This patent is subject to a terminal disclaimer.

(21) Appl. No.: 10/466,683

(22) PCT Filed: Oct. 18, 2001

(86) PCT No.: PCT/EP01/12071

§ 371 (c)(1),
(2), (4) Date: Jul. 21, 2003

(87) PCT Pub. No.: WO03/022424

PCT Pub. Date: Mar. 20, 2003

(65) Prior Publication Data

US 2004/0047778 A1    Mar. 11, 2004

(30) Foreign Application Priority Data

Sep. 5, 2001  (DE) ................................ 101 43 461
Sep. 10, 2001 (DE) ................................ 101 44 400
Sep. 10, 2001 (DE) ................................ 101 44 407
Sep. 10, 2001 (DE) ................................ 101 44 408

(51) Int. Cl.
*B01J 19/26*  (2006.01)
*B01J 19/00*  (2006.01)
*F23D 14/70*  (2006.01)
*C01B 3/36*  (2006.01)

(52) U.S. Cl. ...................... 48/127.9; 422/220; 422/228; 431/347; 431/348; 431/258

(58) Field of Classification Search .................. 48/192, 48/76; 431/260, 264, 258, 339, 350, 263, 431/171, 287, 172
See application file for complete search history.

(56) References Cited

U.S. PATENT DOCUMENTS 1,725,974 A * 8/1929 Brautigam ................. 110/323

(Continued)

FOREIGN PATENT DOCUMENTS

AT          131698          2/1933

(Continued)

*Primary Examiner*—Jennifer A Leung
(74) *Attorney, Agent, or Firm*—Dickinson Wright, PLLC; John M. Naber

(57) ABSTRACT

A system for converting fuel and air into reformate with a reformer which has a reaction space, a nozzle for supplying a fuel/air mixture to the reaction space, and a fuel feed for supplying fuel to the nozzle. In the reaction space, there is a breaker body for a fuel/air mixture supplied through the nozzle.

13 Claims, 15 Drawing Sheets

U.S. PATENT DOCUMENTS

| | | | |
|---|---|---|---|
| 2,394,627 A * | 2/1946 | McCollum et al. | 126/116 R |
| 2,544,299 A * | 3/1951 | Damon et al. | 431/260 |
| 2,650,555 A * | 9/1953 | Howland et al. | 110/262 |
| 3,954,423 A * | 5/1976 | Hamper et al. | 48/107 |
| 4,651,524 A * | 3/1987 | Brighton | 60/274 |
| 6,092,921 A * | 7/2000 | Wentinck et al. | 366/174.1 |
| 6,644,959 B2 * | 11/2003 | Wolf et al. | 431/258 |
| 2003/0022123 A1 * | 1/2003 | Wolf et al. | 431/354 |
| 2004/0068934 A1 * | 4/2004 | Wolf et al. | 48/127.9 |
| 2004/0191131 A1 * | 9/2004 | Wolf et al. | 422/129 |

FOREIGN PATENT DOCUMENTS

| | | |
|---|---|---|
| CH | 255564 | 6/1948 |
| CH | 303815 | 12/1954 |
| DE | 1229229 | 11/1966 |
| DE | 3310200 A1 * | 9/1983 |
| DE | 100 19 198 A1 | 9/2002 |
| FR | 1066117 | 6/1954 |
| GB | 739 699 | * 11/1955 |

* cited by examiner

SYSTEM FOR CONVERTING FUEL AND AIR INTO REFORMATE

BACKGROUND OF THE INVENTION

1. Field of the Invention

The invention relates to a system for converting fuel and air into reformate with a reformer which has a reaction space, a nozzle for supplying a fuel/air mixture to the reaction space, and a fuel feed for supplying fuel to the nozzle.

2. Description of Related Art

Generic systems are used to convert chemical energy into electrical energy. For this purpose fuel and air, preferably in the form of a fuel/air mixture, are supplied to the reformer. In the reformer, conversion of the fuel with atmospheric oxygen takes place, preferably with the process of partial oxidation being carried out.

The reformate which has been produced in this way is then supplied to a fuel cell or a stack of fuel cells, electrical energy being released by the controlled reaction of hydrogen, as a component of the reformate, and oxygen.

The reformer, as already mentioned, can be designed such that the process of partial oxidation is carried out to produce the reformate. In this case, when using diesel as the fuel, it is especially useful to carry out prior reactions before partial oxidation. In this way long-chain diesel molecules can be converted into short-chain molecules with a "cold flame." This ultimately promotes reformer operation. In general, a gas mixture, which is reacted to produce $H_2$ and CO, is supplied to the reaction zone of the reformer. Another component of the reformate is $N_2$ from the air, and depending on the air ratio and the temperature, optionally $CO_2$, $H_2O$ and $CH_4$ as well. In normal operation, the fuel mass flow is controlled according to the required output, and the air mass flow is adjusted to an air ratio in the range of $\lambda=0.4$. The reforming reaction can be monitored by different sensors, for example, temperature sensors and gas sensors.

In addition to the process of partial oxidation, it is also possible to carry out auto-thermal reforming. The process of partial oxidation, in contrast to auto-thermal reforming, is caused by the oxygen being supplied sub-stoichiometrically. For example, the mixture has an air ratio of $\lambda=0.4$. Partial oxidation is exothermal so unwanted heating of the reformer can occur in a problematical manner. Furthermore, partial oxidation tends to intensify soot formation. To prevent soot formation, the air ratio $\lambda$ can be chosen to be smaller. This is achieved so that some of the oxygen used for oxidation is made available by water vapor. Since oxidation with water vapor proceeds endothermally, it is possible to adjust the ratio between the fuel, oxygen and water vapor such that overall heat is neither released nor consumed. The auto-thermal reforming achieved in this way eliminates the problem of soot formation and undesirable overheating of the reformer.

Additionally, it is possible for further steps of gas treatment to proceed following oxidation in the reformer, in particular, methanization can be conducted downstream of the partial oxidation.

A current fuel cell system, for example a PEM system ("proton exchange membrane"), can typically be operated at temperatures between room temperature and roughly 100° C. Based on the low operating temperatures, this type of fuel cell is often used for mobile applications, for example in motor vehicles.

In addition, high temperature fuel cells, so-called SOFC systems ("solid oxide fuel cell"), are known. These systems work in the temperature region of roughly 800° C., a solid electrolyte ("solid oxide") being able to take over transport of oxygen ions. The advantage of these high temperature fuel cells over PEM systems is principally in the areas of durability relative to mechanical and chemical loads.

The application for fuel cells, in conjunction with generic systems, includes not only stationary applications, but also applications in the motor vehicle field, for example as "auxiliary power units" (APU).

For reliable operation of the reformer, it is important to supply the fuel or fuel/air mixture in a suitable manner to the reaction space of the reformer and to condition the fuel or fuel/air mixture suitably in the reaction space. For example, good mixing of the fuel and air and a good distribution of the fuel/air mixture in the reaction space of the reformer are advantageous for the operation of the reformer. Within the framework of the present invention, a fuel-air mixture is referred to if substances are added or will be added to the reaction space of the reformer. The added substances are not limited, however, to the mixture of fuel and air, but rather other substances can also be added, for example water vapor in the case of auto-thermal reforming. To this extent, the concept of a fuel/air mixture should be understood in this general form.

SUMMARY OF THE INVENTION

The object of the invention is to produce a system for reaction of fuel and air into reformate which has advantageous properties with respect to conditioning of the fuel/air mixture in the reaction space of the reformer.

This object is achieved with the features of the embodiments disclosed.

The invention is based on the general teachings of the prior art in that in the reaction space there is a breaker body for a fuel/air mixture supplied through the nozzle. By means of the breaker body provided, flame stabilization can be achieved when the system is operated as a burner, for example, for preheating. This preheating of the system is necessary in order to create ambient conditions suitable for producing the reformate. In the actual reaction of fuel and air into reformate, the breaker body can contribute to improvement of the mixing of fuel and air and to better distribution of the fuel-air mixture in the reaction space of the reformer. If the effect achieved by the breaker body is desirable only for certain operating states, means can be provided which entirely or partially eliminate the action of the breaker body in other operating states. For example, these means can entirely or partially swivel or fold away the breaker body in order to at least partially eliminate the action of the breaker body. For the same purpose, it is conceivable to partially or completely pull the breaker body out of the reaction space through a slot provided in the reaction space wall. In addition, or alternatively, the breaker body can have swiveling louvers with a position which influences the action of the breaker body. Preferably, the breaker body is located stationary in the reaction space and has no moving parts.

In the system of the invention it is preferable to provide the beaker body in the exit direction of the fuel/air mixture relative to the nozzle. In this case, the breaker body is preferably located perpendicular to the main flow direction of the fuel/air mixture.

In particular, with respect to the aforementioned preheating of the system, is it preferred that the breaker body is located in the area of the reaction space which forms a flame zone in burner operation of the system. In this way, the effect of the aforementioned flame stabilization can be advantageously increased. The flame noise is also reduced in this way; which is desirable in many situations. Furthermore, the breaker body also permits the desired burner operation when the atomization quality, for example, in a cold start, is not yet at its optimum. By the arrangement of the breaker body in the flame zone in some operating states of the system of the invention, re-ignition of the fuel on the glowing disk can be facilitated, for example, after flame detachment. In addition, the emissions at the end of burner operation can be reduced if a complete reaction on the glowing breaker body is permitted.

In especially preferred embodiments of the system of the invention, the breaker body has a baffle plate. The baffle plate can have a geometry matched to the respective geometry of the reaction space. For example, the baffle plate can be made circular when the reaction space is cylindrical.

In particular, embodiment in the breaker body is made alternatively conical and/or convex and/or concave at least in sections. The geometry of the breaker body also influences the flow conditions within the reaction space in reformer operation of the system of the invention. In this respect, the geometry of the breaker body, especially if it has a baffle plate, is selected such that the desired mixing of the fuel and air is achieved.

In many situations, it is advantageous for the breaker body to be made pot-like at least in sections. For this embodiment, a baffle plate of the breaker body can be provided in an outside peripheral area with a rib or collar so that a pot-like geometry results. The collar or rib extends, preferably, in the direction to the nozzle and can for example have a height of roughly 2 mm. Of course, very much larger dimensions are also possible.

Furthermore, it is preferred that the outside dimensions of the breaker body are smaller than the inside dimensions of the area of the reaction space in which the breaker body is located. The geometry of the reaction space and of the breaker body is preferably chosen such that at least part of the fuel/air mixture flows past the breaker body.

In this embodiment, the breaker body can be provided in which the ratio of the breaker body diameter to the reaction space diameter is between 0.6 and 0.9. In particular, if the breaker body has a baffle plate, by the indicated dimensioning of the baffle plate compared to other aerodynamic measures an only insignificantly increased pressure loss in the reaction space is achieved. For example, in this dimensioning of the breaker body, the tangential component of an air flow supplied with a swirl is only insignificantly disrupted so that downstream of the breaker body a flow of the fuel/air mixture with a swirl component can be induced.

With respect to the arrangement of the breaker body, it is preferred that the ratio of the axial distance of the breaker body from the atomization point of the fuel/air mixture to the reaction space diameter is between 0.3 and 0.6. These values are considered especially advantageous when the above dimensioning requirements for the breaker body diameter are considered.

One advantageous development of the system calls for the breaker body to have openings, particularly in the form of holes and/or slots. For example, when the breaker body has a baffle plate, the openings can be made in the form of defined perforations of the baffle plate. The number and geometry of the openings and/or slots influence which portions of the fuel/air mixture flow past the breaker body or through it.

Furthermore, the breaker body has at least one partially ring-shaped or ring-shaped section. For example, embodiments in which the breaker body is in the form of a circular ring-shaped baffle plate are possible. In this case, the baffle plate can optionally have a ridge or a collar, especially in is outside peripheral area.

In particular, when preheating of the system of the invention, the breaker body has a chamber to which at least one heating element is assigned. This chamber can be also be used as a starting chamber. If the breaker body has a baffle plate, the areas of the "hot spot" facing away from the baffle plate can be used to heat up the starting chamber or the baffle plate. The chamber can be located, for example, on the edge of the baffle plate. Alternatively, the chamber can also be mounted on any other point of the breaker body or can be formed integrally with the breaker body.

In doing so, alternative embodiments are possible which provide for at least one heating element to be formed by a glow pin and/or a glow plug. The glow pin and/or the glow plug can be activated to initiate burner operation of the system of the invention.

In preferred embodiments of the system of the invention, the breaker body is mounted directly and/or indirectly on the reaction space, particularly on the bottom of the reaction space. In these embodiments, it is possible to fix a baffle plate assigned to the breaker body by means of attachment clips, for example on the bottom of the reaction space. Furthermore, embodiments of the invention can include a breaker body indirectly attached, for example on the aerodynamic internals of the reaction space.

In other preferred embodiments, the breaker body can be provided which is at least, in sections, made of steel, especially high alloy steel and/or ceramic and/or a ceramic-coated steel.

One preferred embodiment of the invention calls for an air guidance means in the air inlet area which imparts a swirl to the in-flowing air. Within the concept of an air inlet area of the invention, the air inlet area must be understood very generally. On the one hand, a cylindrical part of the flow path can be a Venturi nozzle, but the area outside the Venturi nozzle can also be called the air inlet area. What is intended in particular follows from the text of the instant disclosure. By swirling the air entering the nozzle, the atomization quality in the air inlet area and thus the function of the reformer can be clearly improved. The reason for this is that the air speed is increased due to the pronounced tangential motion component of the air.

It can be considered especially advantageous if the air guidance means comprise an air-guiding device with swirl blades. One such air-guiding device can be produced independently as a separate component from the nozzle and can be seated on the nozzle.

In this embodiment, the swirl blades are located on a carrier mounted on the nozzle assembly, and two swirl blades when assembled with the carrier and the nozzle assembly form a conical channel. The tangential air portion and thus the nozzle air swirl can be set depending on the angular position of the swirl blades to a radial plane. The swirl blades can be located approximately, radially or tilted relative to the radius. The swirl blades can also be made flat or curved in the flow direction.

Similarly, it is possible for the air-guiding device to have a pot-shaped sleeve, which is attached to the nozzle assembly, with axial air holes formed in it and peripheral air openings formed in the peripheral wall. In this way, it is possible to impart a defined swirl to the air flowing into the nozzle.

In this embodiment, it is possible for the peripheral air openings to be holes which are formed almost tangentially to the peripheral wall. The tangential arrangement of the holes makes it possible to impart a swirl to the air without further assistance.

Furthermore, the peripheral air openings can include air guide blades. It is, therefore, unnecessary to directly impart the swirl through the peripheral air openings. Instead, it is possible to allow the air to flow through peripheral air openings in any manner, and then to impart the swirl by the air guide blades.

The system of the invention can further include the nozzle being a Venturi nozzle with an air inlet area and a diffuser area which extends downstream with respect to the air inlet area. One such Venturi nozzle causes a high axial air pressure gradient so that combustion air can advantageously be taken in and can be mixed with fuel in the diffuserdiffuser area. In the air inlet area or in the area in which the fuel is supplied to the nozzle, the air flowing into the nozzle has a high speed and an accordingly low pressure. The high flow velocity of the air promotes absorption of the fuel by the in-flowing air. As the fuel/air mixture subsequently flows through the diffuser area of the Venturi nozzle, a pressure recovery occurs so that the mixture can flow into the combustion space of the reformer with sufficient pressure. Furthermore, in the diffuser area advantageous mixing of fuel and air takes place. Thus an effective and economical situation is created for delivering the fuel/air mixture into the reformer. The installation cost and production costs can be benefited by the choice of different embodiments. For example, it is conceivable to form at least part of the diffuser area in one piece with the reformer or the reformer housing or the housing of the reaction space. But it is also conceivable to make and use the nozzle as a whole independently of the reformer.

The nozzle can be advantageously provided with an opening angle of the diffuser area which is variable. Even if, in the simplest case, the diffuser area has a uniform opening angle, it can be useful especially for linking the diffuser part to the reaction space to provide a larger opening angle in the entry area into the combustion chamber. This supports the uniform distribution of the fuel/air mixture in the reaction space, while the opening angle of the part of the diffuser area that is further upstream can be optimized with respect to the flow behavior in that area.

The system of the invention further includes an especially advantageous embodiment in which the liquid fuel is supplied to the Venturi nozzle in the vicinity of the air inlet area through a needle. The fuel needle is supplied with fuel via a fuel line. Based on the high flow velocity of the in-flowing air, the fuel emerging from the fuel needle is almost unpressurized and is pulled into filaments which then break down into droplets. The high air speeds which are necessary for good atomization in the air inlet area can be achieved as a result of the advantageous pressure recovery of the diffuser.

Similarly, the system of the invention includes an especially advantageous structure for the feed of fuel comprising a pipe and a binary fuel nozzle through which a fuel/air mixture is supplied to the Venturi nozzle. Therefore, before the fuel enters the Venturi nozzle, mixing of the fuel with the air is already taking place; which can be advantageous for reliable mixing.

In this embodiment, the binary nozzle can be another Venturi nozzle. Within the Venturi nozzle used for this embodiment of the invention, which can also be called a Venturi tube, there is a smaller Venturi nozzle with a fuel needle located in it. In the smaller Venturi nozzle, emergence of the fuel from the fuel needle and premixing take place. The fuel/air mixture then enters the Venturi tube, i.e. the Venturi nozzle of the invention, and it further mixed there in order to finally enter the reaction space.

In an especially preferred embodiment, there are means provided so that secondary air can flow into the reaction space. The air entering through the Venturi nozzle into the reaction space, i.e. the air present in the fuel/air mixture, can be called primary air in this embodiment. The secondary air is advantageously conveyed through secondary air openings in the housing of the reaction space. The division of the air into primary air and secondary air can be useful for preparing a rich, easily ignited mixture at the outlet of the nozzle. This is especially useful in the starting process of the system, since here the reformer works advantageously as a type of burner.

The system of the invention can also advantageously include fuel feed via a fuel needle in which for the ratio of the inside diameter $d_i$ to the outside diameter $d_a$ of the fuel needle the following applies:

$$0.7 \leq d_i/d_a < 1.$$

The fuel needle is made extremely thin-walled so that at a given fuel throughput, i.e. a given inside diameter, an outside diameter as small as possible is ensured. This ultimately leads to an especially small flow barrier due to the presence of the needle. The indicated tolerance range of diameters is chosen such that a needle can be produced without major difficulty. The principle underlying this embodiment is that the more the ratio of the inside diameter to outside diameter of the fuel needle approaches a value of 1 the greater the advantages provided by the fuel needle.

The system of the invention is especially advantageous when the Venturi nozzle is axially symmetrical and the fuel needle is axially aligned. The axial alignment of the fuel needle provides a low flow resistance for the combustion air. However, if the effort is made to introduce the fuel at a certain angle into the flow area of the Venturi nozzle, it is likewise possible to tilt the fuel needle against the axis of the Venturi nozzle. In this case, the indicated useful ratio between the inside diameter and the outside diameter contributes to minimization of the flow resistance.

Furthermore, it can be useful for the exit plane of the liquid fuel from the fuel needle to run perpendicularly to the flow direction of the liquid fuel through the fuel needle. In this manner, axially symmetrical emergence of the fuel from the fuel needle results, ignoring gravity.

It can also be useful for the exit plane of the liquid fuel from the fuel needle to run obliquely to the flow direction of the liquid fuel through the fuel needle. In this way, a preferential direction upon emergence of the fuel from the fuel needle can be implemented without the fuel needle tilting against the axis of the Venturi nozzle. Due to an oblique cut of the fuel needle in the exit area, an increase of the flow resistance as a result of the tilted fuel needle can be avoided, but emergence of the fuel from the fuel needle pointed, for example against the force of gravity, is still possible.

In addition, it is possible for the exit opening of the fuel needle to be provided with tips and/or to be crenellated. This enables the fuel to be introduced into the fuel chamber with great radial extension which effect cannot be achieved in an optimum manner without a structure on the edge of the exit due to at least constriction effects.

The system of invention preferably also includes the embodiment that the air inlet area has an essentially cylindrical part which has a transition to the diffuser area, such that the exit opening of the fuel needle is located in the cylindrical part and that there is an axial distance between the exit opening of the fuel needle and the transition. This ensures that the liquid fuel, which has emerged from the exit opening of the fuel needle, is still transported together with the in-flowing air over a certain distance through a region of high flow velocity. This ensures particularly good atomization. In most cases, it will be a beneficial to place the exit from the fuel needle at the start of the cylindrical part of the air inlet area of the Venturi nozzle in order that essentially the entire cylindrical area is available for good distribution of the atomized fuel in the rapidly flowing combustion air.

Furthermore, the system of the invention preferably includes a design which can be installed with the reformer in a motor vehicle, so that the opening of the fuel needle is located above the axis of the Venturi nozzle. This embodiment makes it possible to arrange the fuel needle parallel to the axis of the Venturi nozzle and at the same time to counteract the effect of gravity. If the installation position of the fuel needle is chosen with respect to the axis of the Venturi nozzle for an installation position of the reformer where it is pushed away from the axis radially upward and then in the peripheral direction, two installation positions of the reformer can be allowed. The two installation positions provide favorable equalization of the force of gravity taking place by the location of the opening above the axis of the Venturi nozzle.

In addition, the system of the invention can include a nozzle composed of ceramic material with the air guidance means being constructed in a single piece with the nozzle. In this way, a nozzle can be economically produced. The ceramic material can be easily machined with numerous variations being possible with respect to shaping the ceramic material. In particular, the air guidance means, which imparts a swirl to the air outside the air inlet area, can be made in one piece with the nozzle. As a result of using a ceramic material, there is the additional advantage that the area of the nozzle around the fuel needle located in the nozzle does not undergo overly high temperatures so that ignition of the fuel emerging form the nozzle does not occur. The one-piece execution of the air guidance means makes it possible to easily adhere to tolerances since miscalibration of the air guidance means is no longer possible when the reformer is assembled.

The invention furthermore advantageously includes the embodiment where the nozzle has means for holding a glow pin. The positioning of the glow pin with respect to the nozzle is an important parameter with respect to good starting behavior of the reformer. In heaters of the prior art, the glow pin was generally held by the reformer housing such that positioning fluctuations with respect to the nozzle occur. These tolerance problems can be eliminated by the nozzle of the invention which includes in the nozzle itself a means for holding the glow pin. Therefore, the glow pin always has the same position relative to the nozzle.

The nozzle of the invention also advantageously includes a nozzle having, at least partially, an essentially cylindrical shape and further includes an air guidance means forming channels which are offset with respect to the radial directions. Consequently, the air flowing perpendicular to the axis of the nozzle is not radially supplied, but is supplied with an offset. This offset determines the swirl which is imparted to the air, thus the flow behavior and ultimately also the properties and the quality of the combustion are improved.

It is particularly beneficial for the air guidance means of the invention to have essentially triangular base surfaces with the corners being rounded. In this construction, the channel offset can be easily implemented. The rounding of the corners is advantageous for uniform flow behavior.

In another preferred embodiment of this invention, the means for holding the glow pin is a hole which runs slanted to the cylinder axis. The glow pin can then be introduced simply into the hole for suitable positioning. A stop on the glow pin and/or within the hole enables the glow pin to be guided into its optimum position with respect to the nozzle.

The nozzle of the invention is also advantageously provided in which an at least essentially cylindrical part of the nozzle has an essentially cylindrical shoulder with an enlarged diameter, and that the means for holding the glow pin is a hole which penetrates the shoulder runs slanted to the cylinder axis. In this way, the glow pin can be held in the area such that the glow pin influences the flow behavior of the in-flowing fuel-air mixture as little as possible. The cylindrical shoulder, which has a larger diameter than the remaining nozzle body, can be easily constructed.

Similarly, an especially advantageous embodiment of the invention is provided when the at least essentially cylindrical part of the nozzle has an essentially cylindrical shoulder with an enlarged diameter, and the cylindrical shoulder has recesses for holding mounting pins. The mounting pins can be, for example, permanently mounted on the heat shield of the reformer. The relative positioning of the nozzle is fixed by the recesses in the shoulder and the position of the mounting pins. Thus mounting of the nozzle is easily possible with only small tolerances.

In another preferred embodiment, the system of the invention can include the feature that the reformer, the nozzle and the fuel feed are located on one axis, and that means for holding the nozzle and the fuel feed are provided. Additionally, there are at least two axially aligned mounting pins mounted on the reformer such that the nozzle and the fuel feed comprise positioning means which interact with the mounting pins. The result is that the means for holding the components interact with the mounting pins so that the reformer, the nozzle, the fuel feed and the means for holding the components are located axially in succession. In this way, all positions of the components are oriented relative to the mounting pins so that narrow tolerances can be maintained. Therefore, the fuel needle is positioned extremely accurately with respect to the nozzle. Furthermore, the positioning of the glow pin, which is required for starting behavior, is dictated by the positions of the mounting pins. Ultimately, a stable structure results which ensures high quality reformer operation.

The system of the invention also advantageously includes means for holding the components are constructed as a spring which is held on the mounting pin by clamp disks. Attachment with such a spring has the advantage that mechanical stresses, especially as a result of temperature effects, can be equalized. In systems of the prior art, undesirably high forces can act on the reformer and on an optional heat shield of the reformer due these mechanical stresses which ultimately results in deformation of the reformer.

The system of the invention also advantageously includes mounting pins that are welded onto the reformer. In this way, the mounting pins are securely connected to the reformer in a defined position with respect to the reformer.

Additionally, another preferred embodiment of the invention includes providing, between the nozzle and the reformer, a seal which is used both for thermal insulation and for matching the nozzle to the heat shield of the reformer.

Another preferred embodiment of the invention includes providing the seal with at least one mica layer facing the reformer and at least one graphite layer facing the nozzle. This construction provides the advantageous properties of the seal in a reliable manner.

Still another preferred embodiment of the invention includes providing the fuel feed as a metal knit. This is used to break down bubbles in the fuel. Furthermore, in this way a counterpressure for a damper, which is optionally located on the fuel line, is made available.

The present invention is based on the finding major advantages can be realized by providing a breaker body for the fuel/air mixture supplied by the nozzle in the reaction space. In this construction, advantages are achieved both in burner operation and in reformer operation of the system of the invention. In burner operation, i.e., for preheating the system, a cold start is facilitated. In reformer operation, the mixing especially of fuel and air is improved so that ultimately a reformate with improved properties results.

DETAILED DESCRIPTION OF THE INVENTION

In the following description of the drawings the same reference numbers label the same or comparable components.

Figure 1:
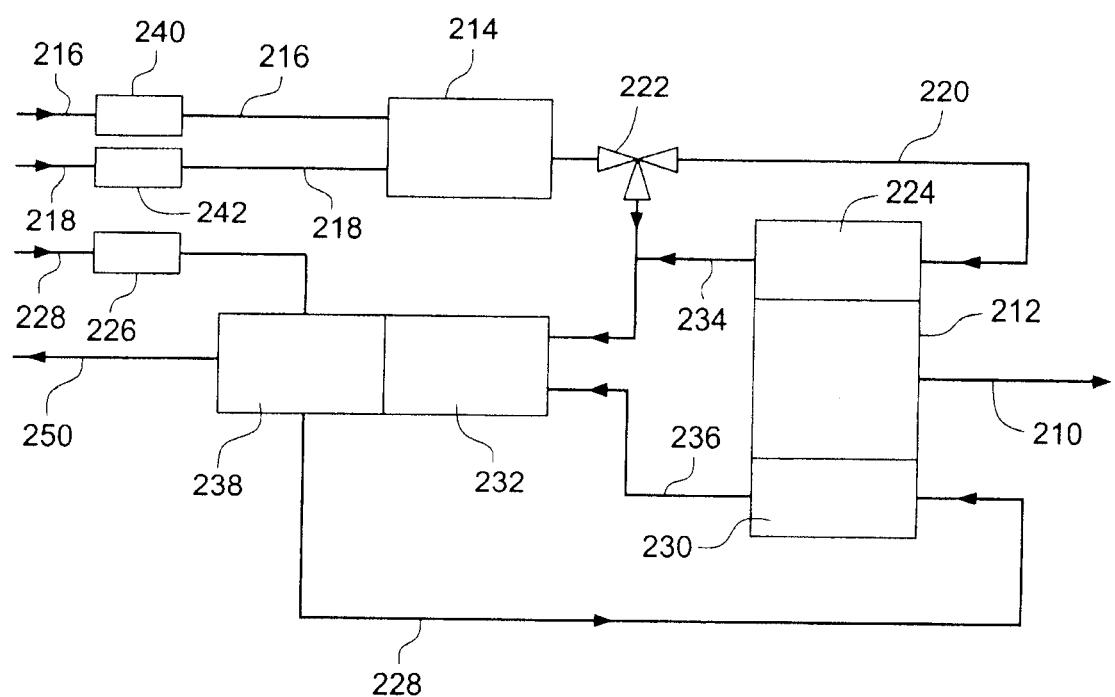
FIG. 1 shows a schematic block diagram of a fuel system in which the invention can be employed.

FIG. 1 shows a schematic block diagram of a system in which this invention can be used. Fuel 216 is supplied to a reformer 214 via a pump 240. Furthermore, air 218 is supplied to the reformer 214 via a fan 242. The reformate 220 produced in the reformer 214 travels via a valve means 222 to the anode 224 of a fuel cell 212. The cathode 230 of the fuel cell 212 is supplied with cathode feed air 228 via a fan 226. The fuel cell 212 produces electrical energy 210. The anode exhaust gas 234 and the cathode exhaust air 236 are supplied to the burner 232. Likewise, reformate can be supplied to the burner 232 via the valve means 222. The thermal energy produced in the burner 232 can be supplied in a heat exchanger 238 to the cathode feed air 228 so that it is preheated. Exhaust gas 250 flows out of the heat exchanger 238.

The above system when used in conjunction with the invention described below can supply a fuel/air mixture to the reformer 214.

Figure 2:
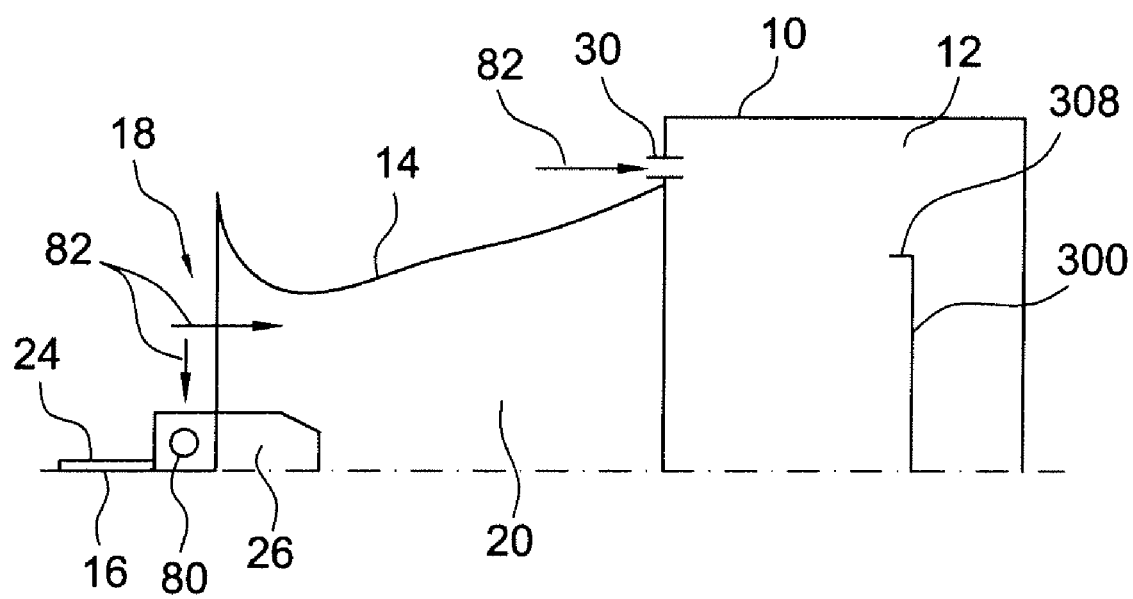
FIG. 2 shows a schematic sectional view of first embodiment of the the invention.

FIG. 2 shows a schematic sectional view of one embodiment of the invention. The invention comprises a reformer 10 with a reaction space 12. A Venturi nozzle 14 is connected to the reformer 10. The nozzle has an air inlet area 18 and a diffuser 20 with a cross section which increases in the direction toward the reformer 10. Within the Venturi nozzle 14, in the vicinity of the air inlet area 18, there is a fuel feed 16. The fuel feed 16 includes a pipe 24 for feed of fuel and a binary nozzle 26. The binary nozzle 26 is provided with an opening 80 into which air 82 can flow. The air is mixed within the binary nozzle 26 with fuel supplied by the pipe 24. From the downstream opening of the binary nozzle 26 a fuel/air mixture can emerge which is entrained by the air 82 which enters the air inlet area 18 of the Venturi nozzle 14. The fuel/air mixture mixes with the air 82 which has flowed into the air inlet area 18 of the Venturi nozzle 14, and the resulting fuel/air mixture travels via the diffuser 20 into the reaction space 12 of the reformer 10. Additionally, it is possible to provide an opening 30 to the reaction space 12 of the reformer 10 through which secondary air 82 can enter the reaction space 12. A breaker body in the form of a baffle plate 300 is located in the reaction space 12 relative to the nozzle 14 in the exit direction of the fuel/air mixture. The baffle plate 300 in its outside peripheral area has a peripheral rib 308 such that a pot-like geometry results. The breaker body 300 is located in the area of the reaction space 12 which forms a flame zone during burner operation of the system.

Figure 3:
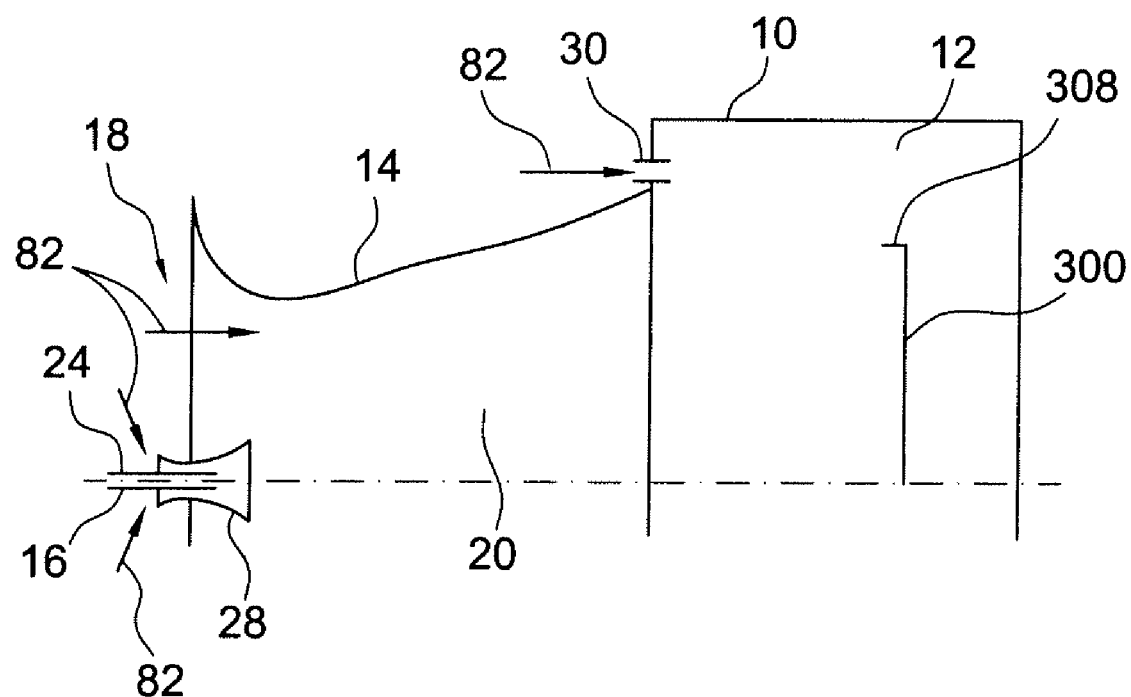
FIG. 3 shows a schematic sectional view of second embodiment of the invention.

FIG. 3 shows a schematic sectional view of another embodiment of the invention. The fuel feed 16 in the system shown in FIG. 3 is different from the system shown in FIG. 2. The fuel is first supplied in turn via a pipe 24, but then travels into another Venturi nozzle 28 which is much smaller than the Venturi nozzle 14. In the Venturi nozzle 28, the liquid fuel is picked up and atomized by the air 82 which is flowing past the exit opening of the pipe 24 at high speed. The resulting fuel/air mixture is then entrained by the air 82 which flows in the air inlet area 18 of the Venturi nozzle 14 so that the fuel/air mixture can mix with air 82 in the air inlet area 18. In order to further improve the mixing particularly in reformer operation, a breaker body in the form of a baffle plate 300 is located in the reaction space 12. Similarly to the embodiment from FIG. 2, the baffle plate 300 in its outside peripheral area has a rib 308 such that a pot-like geometry results.

Figure 4:
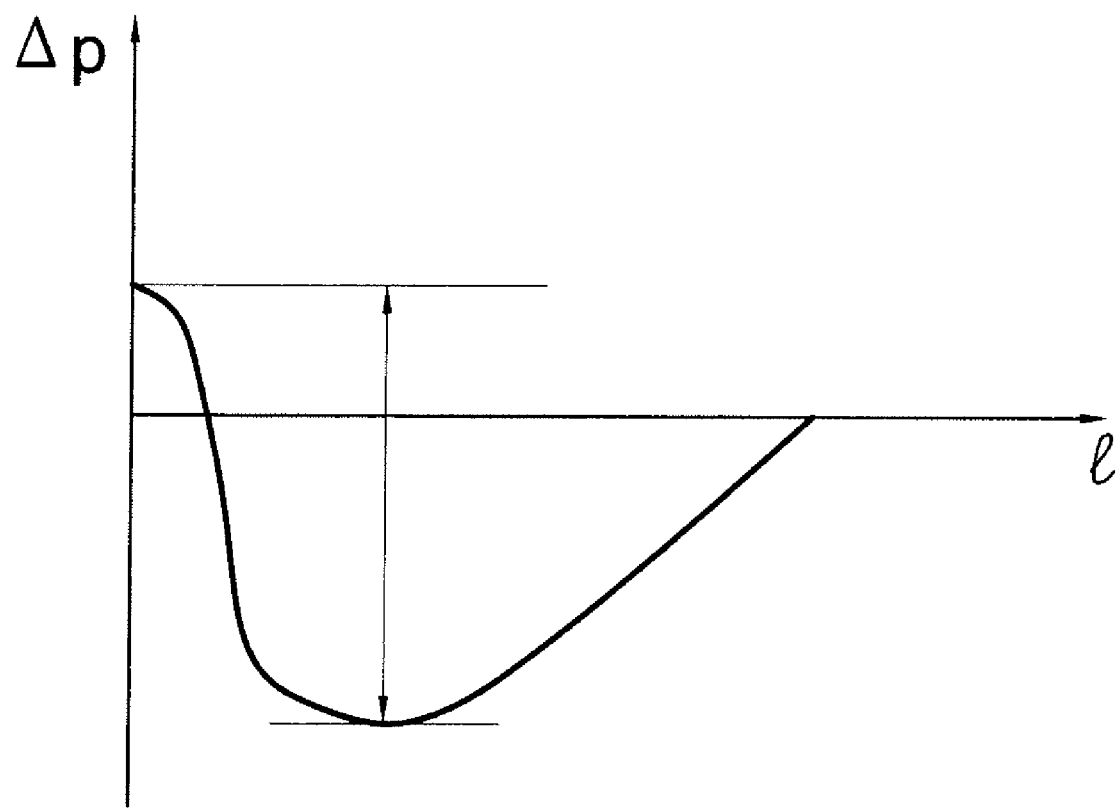
FIG. 4 is a diagram of the axial pressure behavior in the Venturi nozzle.

The FIG. 4 diagram provides an explanation of the axial pressure distribution in a Venturi nozzle. The pressure difference, $\Delta p$, between the pressure at a certain coordinate and the pressure in the reaction space 12 (see FIGS. 2 and 3) is plotted. The air 82 is generally fed into the air inlet region 18 of the Venturi nozzle 14 by a fan (not shown), this air being made available with only a low overpressure. As a result of the speed increase of the in-flowing air, the pressure drops to a minimum value. As the air continues to flow through the diffuser of the Venturi nozzle, the flow velocity decreases again and the pressure increases gradually to the reaction chamber pressure. It has been shown that if the ratio of the breaker body diameter to the reaction space diameter is between 0.6 and 0.9. and if the ratio of the axial distance of the breaker body 300 from the atomization point of the fuel/air mixture to the reaction space diameter is between 0.3 and 0.6, only a slightly increased pressure loss occurs in the reaction space 12.

Figure 5A:
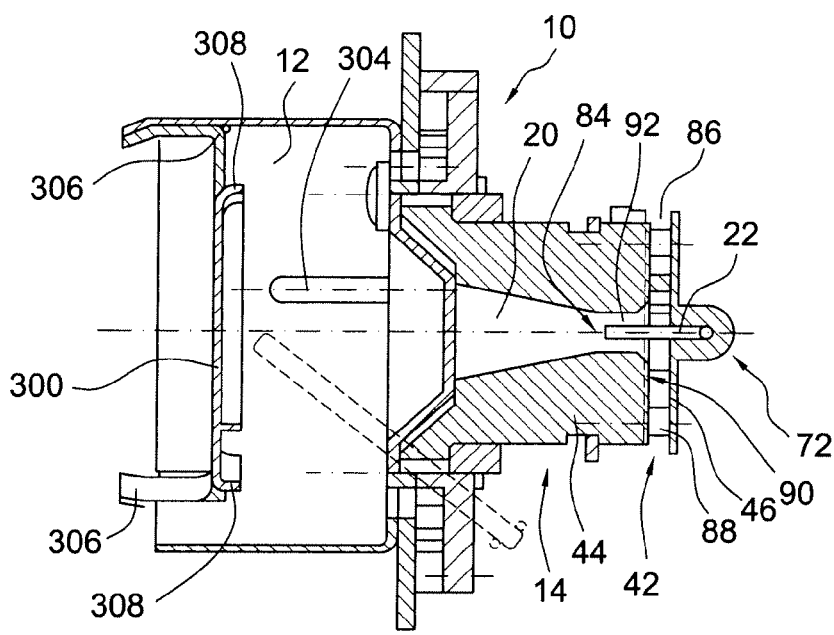
FIG. 5a shows a schematic sectional view of another embodiment of the invention.

FIG. 5a shows a schematic sectional view of still another embodiment of the invention. The invention comprises a Venturi nozzle 14 with a nozzle assembly 44. Furthermore, there is a fuel feed 72 for supplying liquid fuel to the nozzle 14. The fuel is supplied to the air inflow area 92 via the fuel exit 84 of the fuel needle 22, there entrained by the inflowing air and then travels via the diffuser 20 as a fuel/air mixture to the reaction space 12 of the reformer 10. The nozzle assembly 44 is connected downstream of an air-guiding device 42 which impresses a swirl on the air flowing into the Venturi nozzle 14. The air-guiding device 42 is a carrier 46 located opposite the end face 90 of the nozzle assembly 44 at a distance, and is, for example, circular. The air-guiding device 42 forms an annular gap 86 together with the end face 90 of the nozzle assembly 44. On the carrier 46 there are swirl blades 88 which are pointed against the end face 90 of the nozzle assembly 44 and adjoin it in the assembled position. In the reaction space 12, there is again a breaker body 300. The breaker body is also formed in this embodiment by a baffle plate 300 which has a rib 308 into its outside peripheral area so that a pot-shaped geometry is formed. The rib 308,is interrupted by the mounting clips 306 with which the baffle plate 300 is attached to the reaction space wall. The ratio of the baffle plate diameter to the reaction space diameter in the embodiment shown in FIG. 5a is roughly 0.75 and is thus in the preferred range from 0.6 to 0.9. The ratio of the axial distance of the baffle plate 300 from the atomization point of the fuel/air mixture to the reaction space diameter is in the preferred range from 0.3 to 0.6.

Figure 5B:
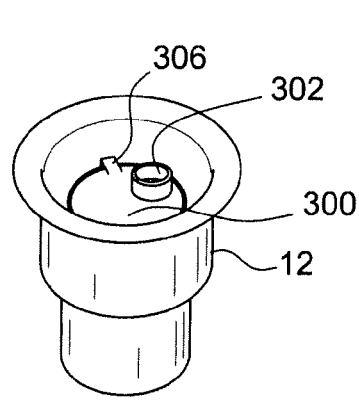
FIG. 5b shows a perspective of one embodiment of the reaction space of the invention.
Figure 5C:
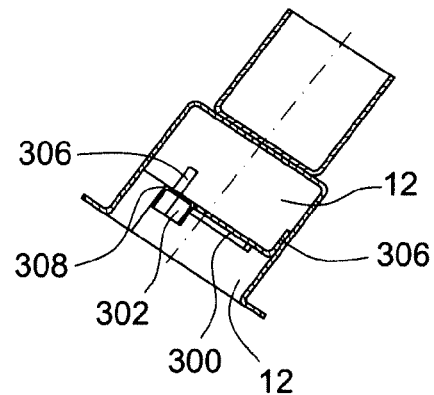
FIG. 5c shows a sectional view of the reaction space of FIG. 5b.
Figure 5D:
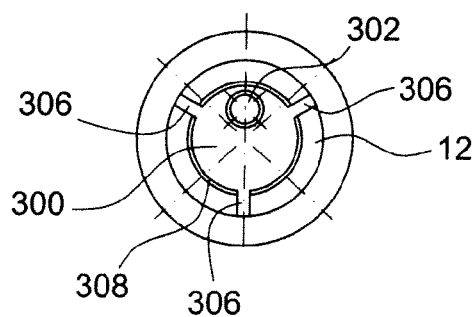
FIG. 5d shows an overhead view of the reaction space of FIG. 5b.

FIG. 5b shows a perspective of an embodiment of the reaction space of the system of the invention, FIG. 5c shows a sectional view of the reaction space from FIG. 5b and FIG. 5d shows an overhead view of the reaction space from FIG. 5b. It can be seen from these figures that the reaction space 12 is made essentially cylindrical. The breaker body 300, which is attached to the reaction space wall by mounting clips 306, is essentially a baffle plate which has a chamber 302. In the finished state of the system, a glow pin or glow plug 304 projects into this chamber 302 in order to form an ignition element. The chamber 302 is preferably made such that the glow pin or the glow plug 304 projects in a straight line so that the radiant energy of the glow pin or the glow plug 304 downstream of the nozzle 14 can be used to heat components. Although it is not shown, the breaker body 300 or the baffle plate 300, as in all embodiments, have openings in the form of holes and/or slots to benefit flow behavior.

Figure 6:
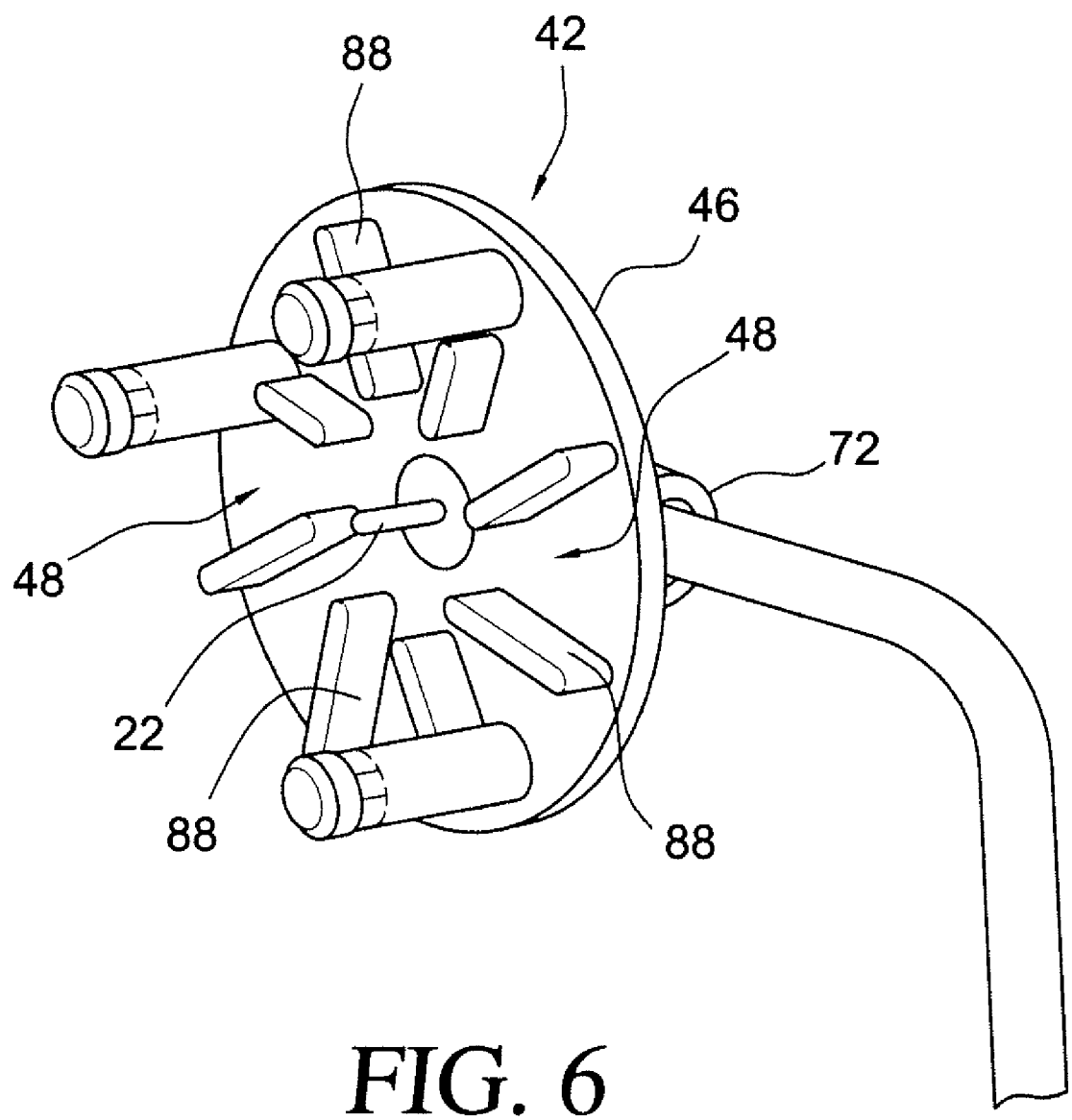
FIG. 6 shows a perspective of a carrier with an air-guiding device for use in the system of the invention.

FIG. 6 shows a perspective view of an air-guiding device 42 for use in a system of the invention. The swirl blades 88 are arranged offset on a carrier 46 with respect to the radii of the circular arrangement in order to produce a tangential flow component. Two adjacent swirl blades 88 together with the carrier 46 and the nozzle assembly 44 form a conical channel 48.

Figure 7:
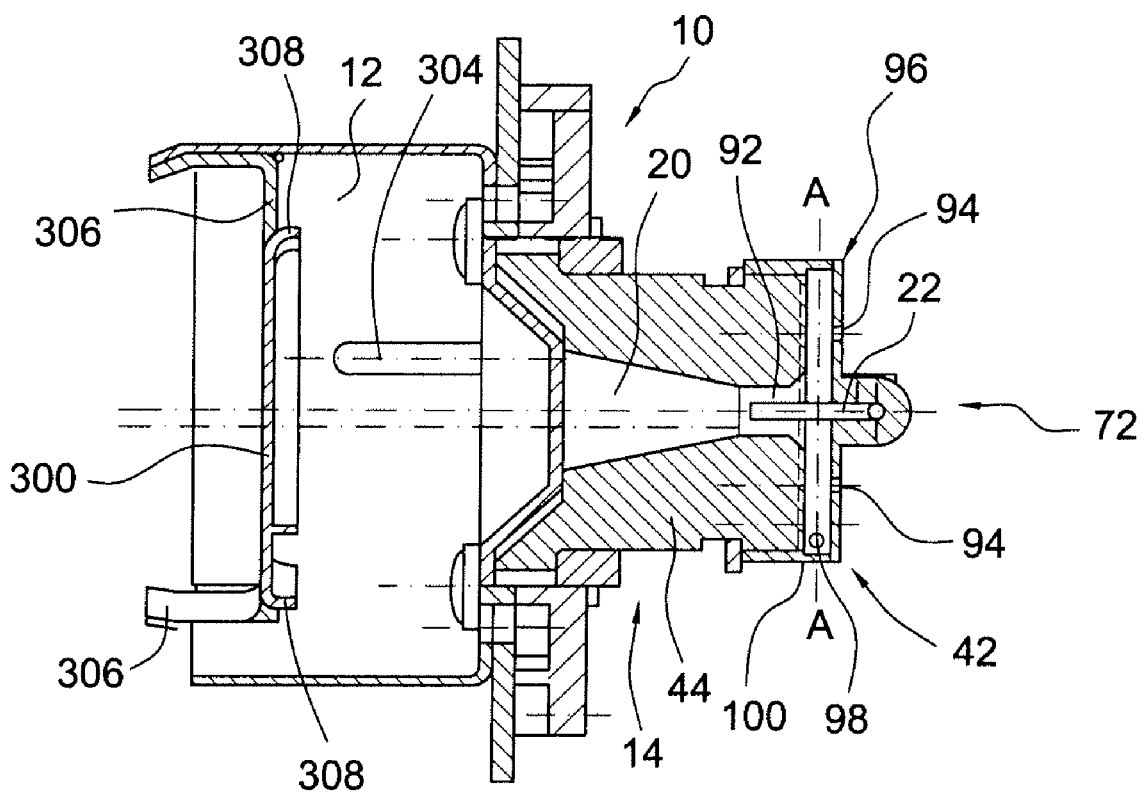
FIG. 7 shows schematic sectional view of another embodiment of the system of the invention.

FIG. 7 shows a schematic sectional view of another embodiment of a system of the invention. This embodiment of the system differs from that shown in FIG. 5 in that the air-guiding device 42 is made as a pot-shaped sleeve 96. The sleeve 96 in its bottom has axial holes 94, and in the peripheral wall 100 of the sleeve 96 tangential holes 98 are formed. The sleeve 96 is attached to the nozzle assembly 44 of the Venturi nozzle 14, for example by slipping it on or by some other form of positive, non-positive or material connection. The axial holes 94 and the tangential holes 98 are matched to one another such that a defined swirl is imparted to the inflowing air The arrangement of the breaker body 300 corresponds essentially to the embodiment of FIG. 5a. The breaker body again has a baffle plate 300 which is attached via mounting clips 306 to the reaction space wall. Otherwise, reference is made to the details on the breaker body 300 of FIG. 5a.

Figure 8:
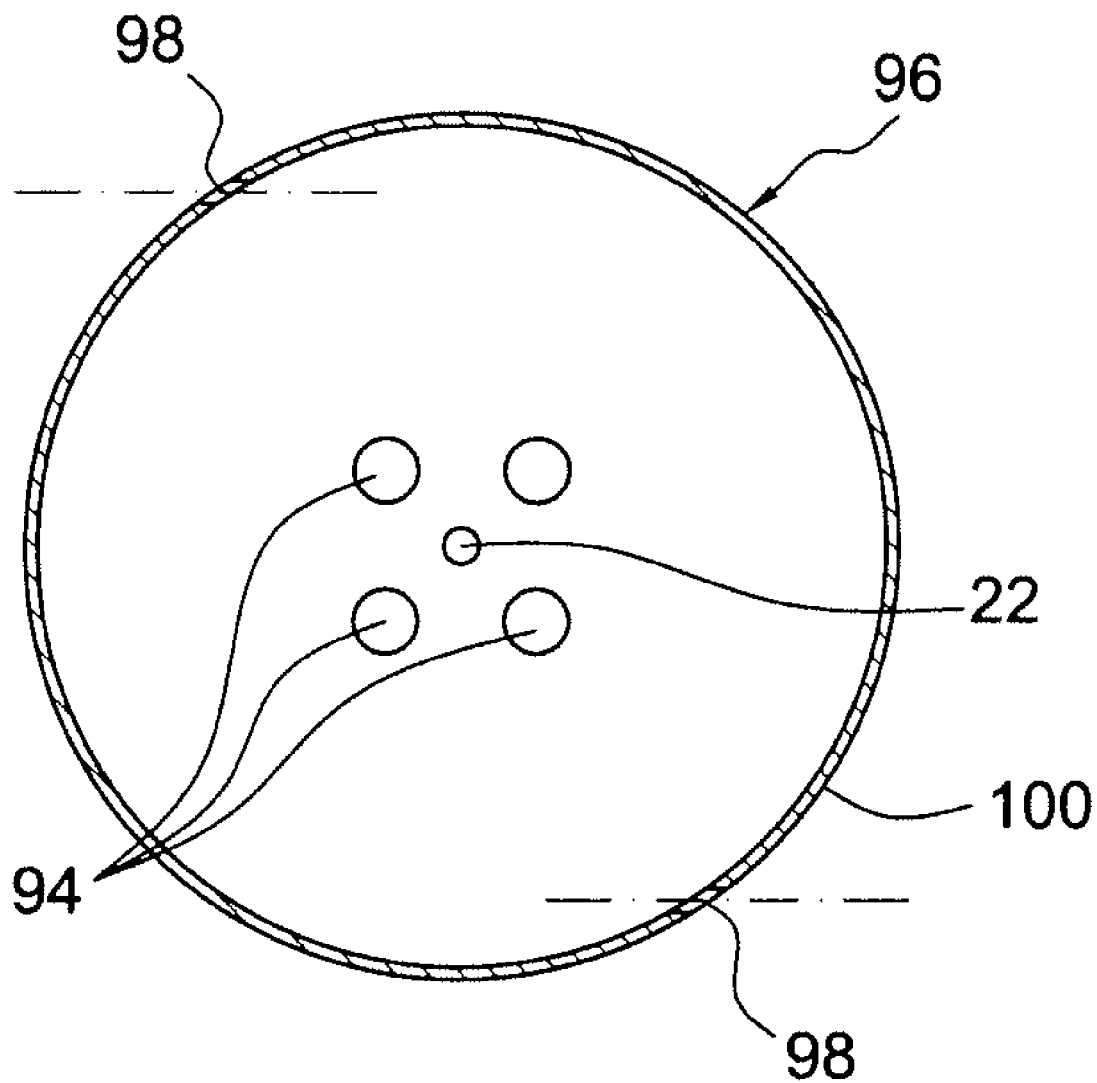
FIG. 8 shows a schematic sectional view along the cross sectional plane identified by A-A in FIG. 7.

FIG. 8 shows a schematic sectional view along the cross sectional plane identified by A-A in FIG. 7. A sample arrangement of the axial holes 94 and the tangential holes 98 in the sleeve 96 is shown. If necessary, by varying the number of openings or holes 94, 98 the size and arrangement the swirl of the air flow can be adjusted.

Figure 9:
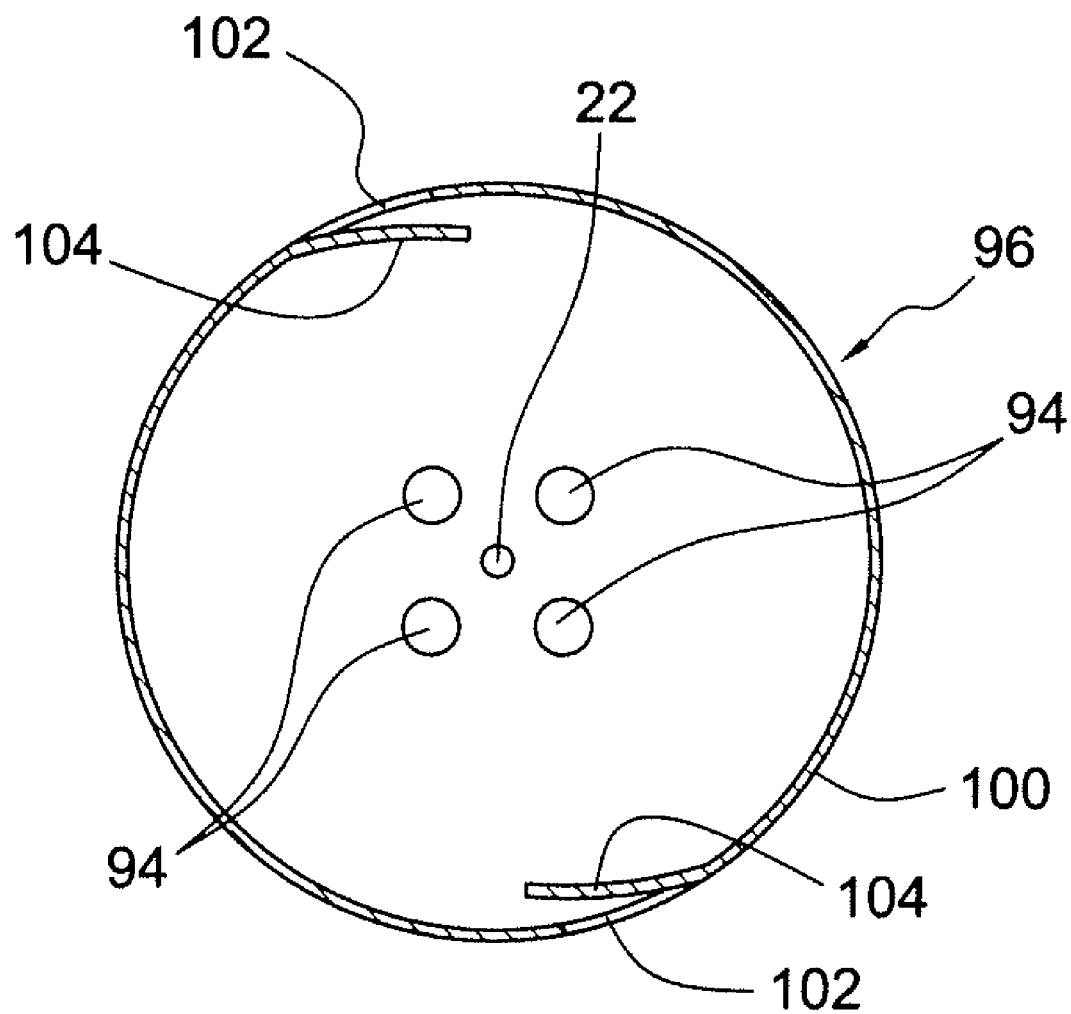
FIG. 9 shows a schematic sectional view, corresponding to the section as shown in FIG. 8, of another embodiment of an air-guiding device.

FIG. 9 shows a schematic sectional view, corresponding to FIG. 8, of another embodiment of an air-guiding device. The sleeve 96 has air openings 102 in its peripheral wall 100 which are bounded towards the center of the sleeve 96 by an air guide blade 104 assigned to each respective air opening 102. A tangential flow component is impressed on the inflowing air by the air guide blades 104.

Figure 10:
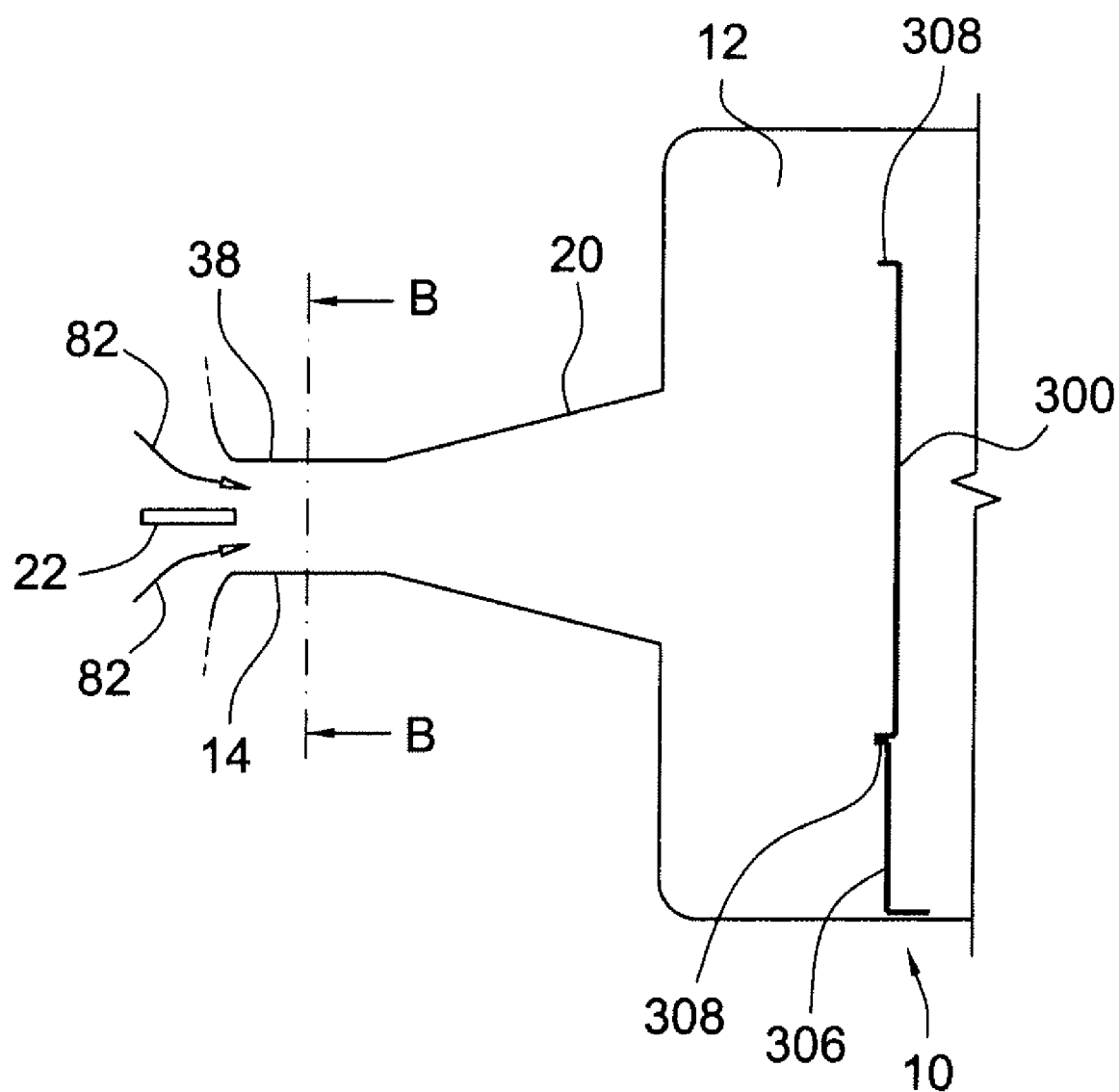
FIG. 10 shows a schematic sectional view of another embodiment of the invention.

FIG. 10 shows a schematic sectional view of another embodiment of a system of the invention. The representation is highly schematic so that important components of the system can be illustrated. In the cylindrical part 38 of the Venturi nozzle 14 there is a fuel needle 22 for supplying fuel. On the one hand it is good practice to arrange the fuel needle 22 in exactly this narrowed cylindrical part 38 of the Venturi nozzle 14, since the combustion air 82 flowing with high flow velocity promotes atomization of the fuel. On the other hand, the fuel needle 22 also represents a flow barrier to the inflowing combustion air 82. This is a basic problem which is solved by the features described below in conjunction with the system of the invention. A breaker body 300 provided in the reaction space 12 is also attached to the reaction space wall in this embodiment with mounting clips 306. The breaker body 300 has a pot-like geometry as a result of the rib 308; this benefits flow properties. Line B-B identifies a radial cutting plane to which reference is made in the following description.

Figure 11:
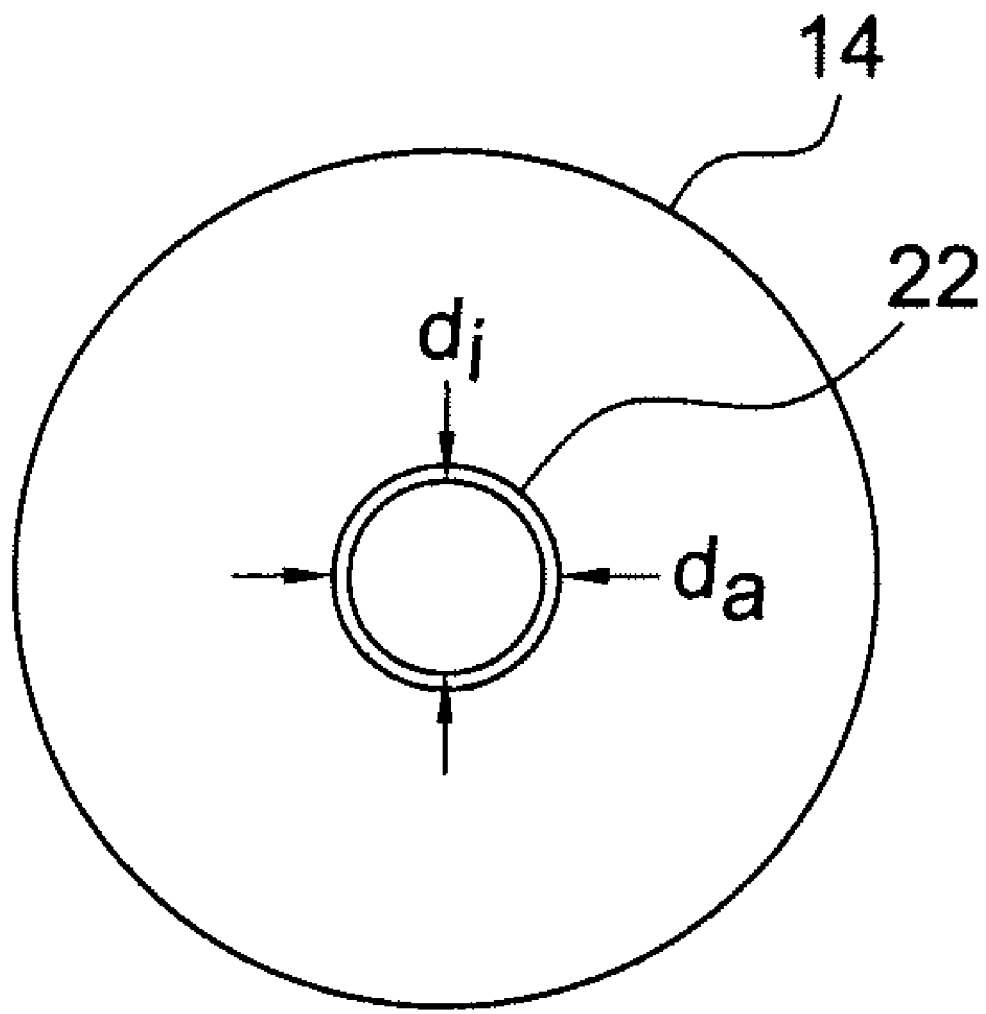
FIG. 11 shows a schematic sectional view along the plane identified by B-B in FIG. 10.

FIG. 11 shows a sectional view along the plane identified in FIG. 10 with B-B. It can be understood that current invention solves the problem described in conjunction with FIG. 10. That is, by choosing the ratio between the inside diameter $d_i$ and the outside diameter $d_a$ of the fuel needle 22 to be as near a value of 1 as possible, the fuel needle 22 represents a minimum flow resistance for the in-flowing combustion air in the Venturi nozzle 14.

Figure 12:
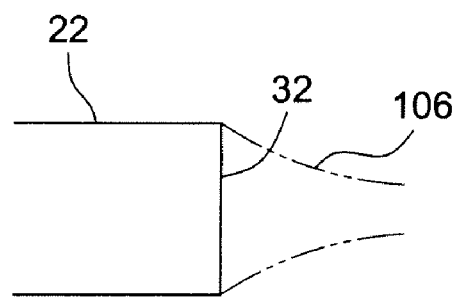
FIG. 12 shows a fuel needle with a first exit opening for use in the system of the invention.

FIG. 12 shows a fuel needle 22 with a first exit opening for use in a system of the invention. In this embodiment, the exit plane 32 of the fuel 106 from the fuel needle22 is perpendicular to the main flow direction of the fuel 106. This results in constriction of the fuel 106 outside the fuel needle 22 which can be disadvantageous with respect to the uniform distribution of the fuel 106 in the Venturi nozzle and ultimately in the combustion chamber.

Figure 13:
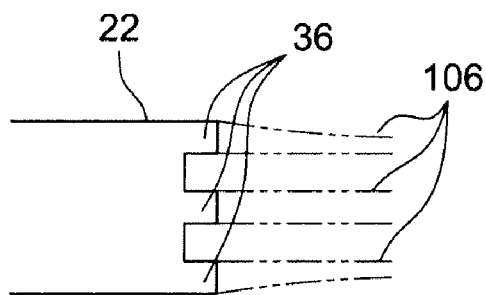
FIG. 13 shows a fuel needle with a second exit opening for use in the system of the invention.

FIG. 13 shows a fuel needle 22 with a second outlet opening for use in a system of the invention. In this embodiment, the exit opening of the fuel needle 22 has crenellations 36. These crenellations 36 concentrate emerging fuel 106 in certain areas and ultimately the result is that the fuel 106 is distributed almost homogeneously over the entire flow cross section available to the fuel 106.

Figure 14:
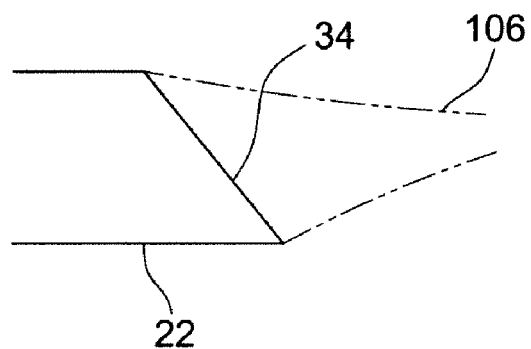
FIG. 14 shows a fuel needle with a third exit opening for use in the system of the invention.

FIG. 14 shows a fuel needle 22 with a third exit opening for use in a system of the invention. In this embodiment, the fuel needle 22 is provided with a beveled opening 34. The latter structure imparts to the out-flowing fuel 106 a preferential direction so that the effect of the force of gravity can be counteracted.

The special embodiments of the fuel needles which are described within the framework of this disclosure can be combined in a manner advantageous to the invention. For example, it is conceivable for a slanted exit plane to be combined with a crenellated structure.

Figure 15:
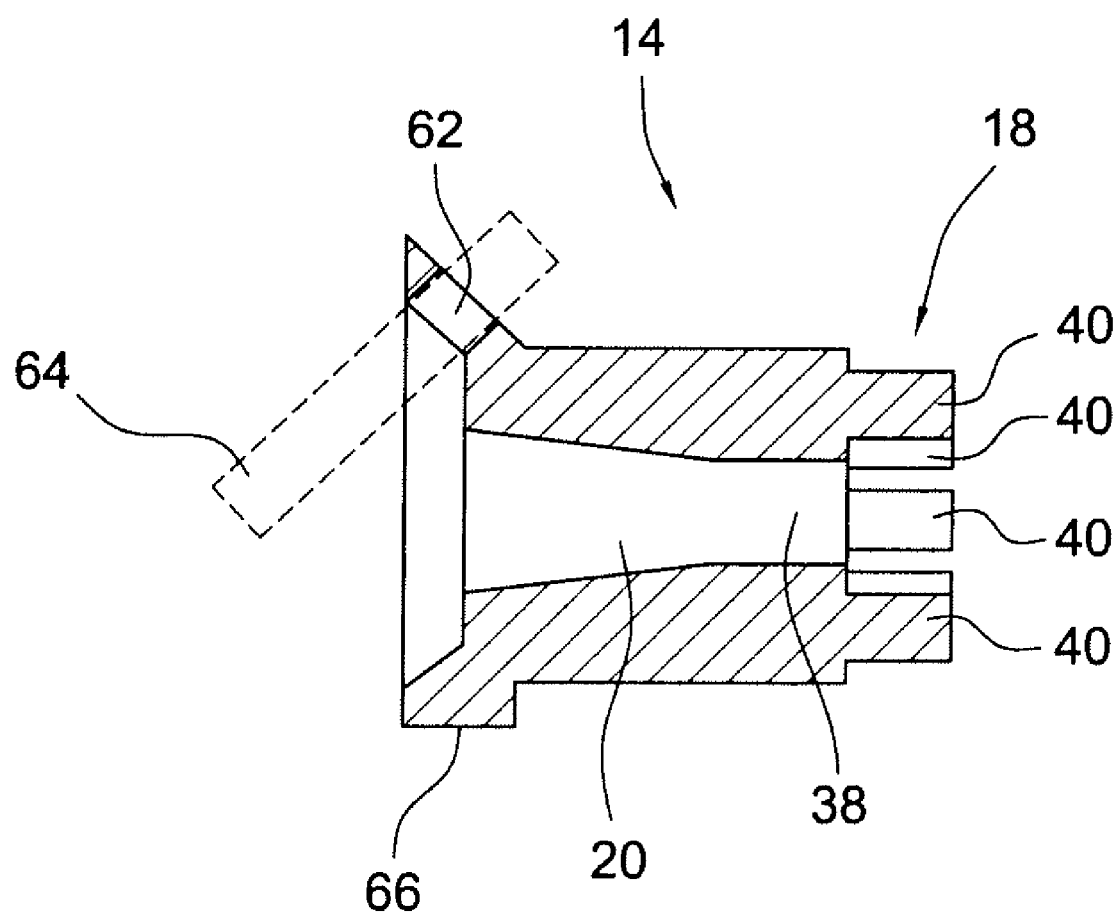
FIG. 15 shows a partially cut side view of an embodiment of the nozzle for used in the system of the invention.

FIG. 15 shows a partially cutaway side view of one embodiment of a nozzle 14 for use in a system of the invention. The Venturi nozzle 14 is made of ceramic material; this simplifies the production of the nozzle 14 compared to metal nozzles. In the air inlet area 18 there are air guidance means 40. They are made in one piece with the nozzle 14. In particular, they are made of ceramic material. The air guide elements 40 are aligned such that a swirl is imparted to the supplied air; this is detailed below with reference to FIG. 16. The Venturi nozzle 14 is furthermore provided with a hole 62. A glow pin 64 can be inserted into this hole 62 and is used to ignite the fuel/air mixture entering the reaction space which is not shown in FIG. 15. In particular, when the system of the invention starts, the reformer functions in the manner of a burner so that initial ignition of the fuel/air mixture can be performed. It is advantageous, in the arrangement of the glow pin 64 in a hole 62 of the nozzle 14, that the positioning of the glow pin 64 is fixed with respect to the nozzle 14. Therefore, the positioning of the glow pin 64 does not particularly depend on any other components. In this way, very small tolerances can be maintained with respect to the installation location of the glow pin 64. The hole 62 advantageously penetrates the cylindrical shoulder 66 of the nozzle 14 which has an increased radius. This has the advantage that the flow behavior of the nozzle 14 is influenced only little by the hole 62 or by the glow pin 64 located in the hole 62.

Figure 16:
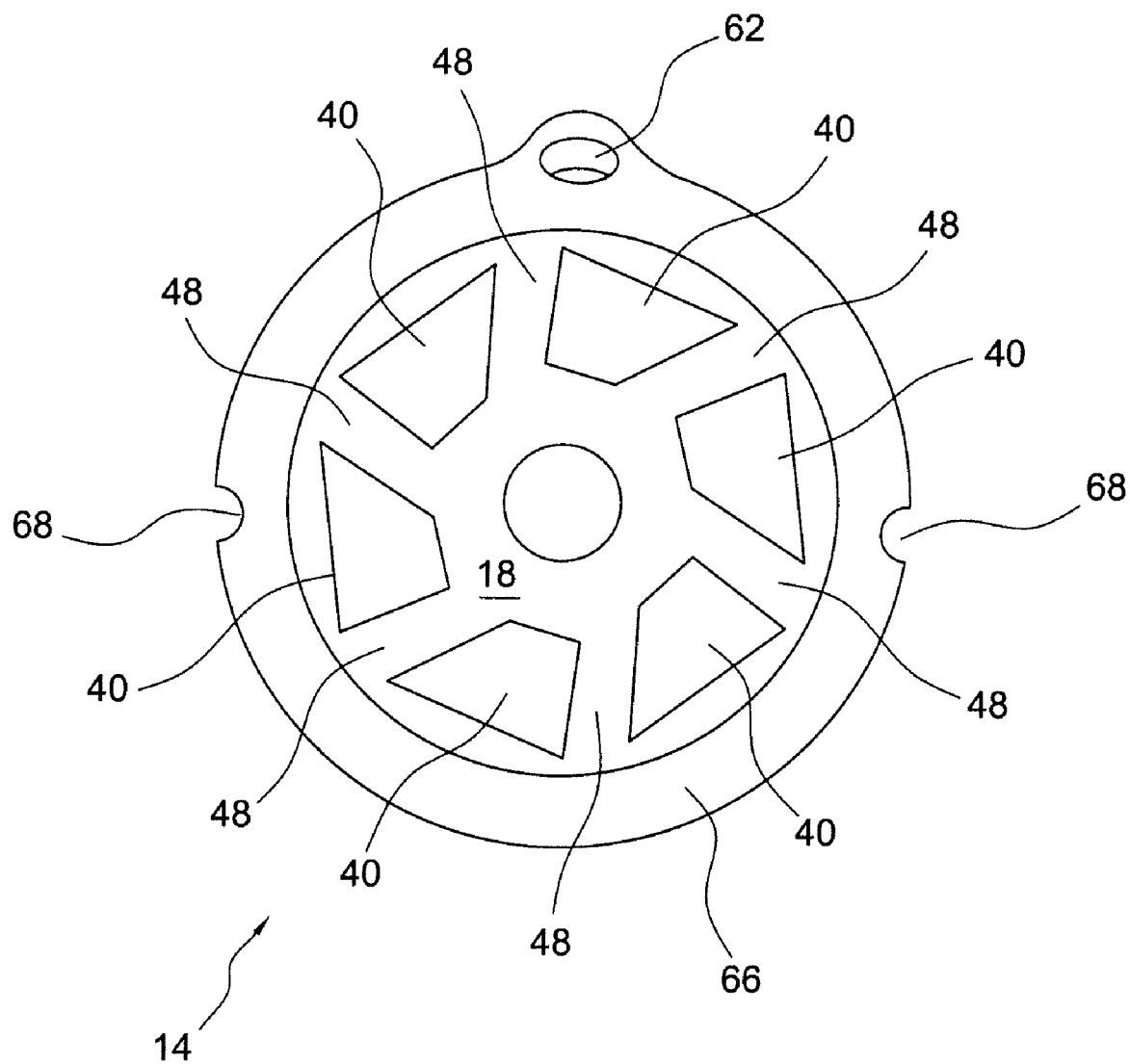
FIG. 16 shows an overhead view of the air inlet area of a nozzle used in the system of the invention.

FIG. 16 shows an overhead view of the air inlet area 18 of a nozzle 14 for use in the system of the invention. One configuration of the air inlet area 18 and the air guide elements 40 is illustrated. The air guide elements 40 form channels 48 for the in-flowing air. These channels 48 are positioned with an offset with respect to the radius of the structure which has essentially a single axis. Air flowing in from the outside undergoes a swirl. This provides advantageous properties with respect to atomization of the fuel emerging from the fuel needle. Furthermore, in this embodiment the arrangement of the opening 62 for holding the glow pin can be recognized. The glow pin penetrates an essentially cylindrical shoulder 66. The shoulder 66 is furthermore provided with recesses 68. These recesses 68 define the installation position of the nozzle 14 which is detailed below with respect to FIG. 17.

Figure 17:
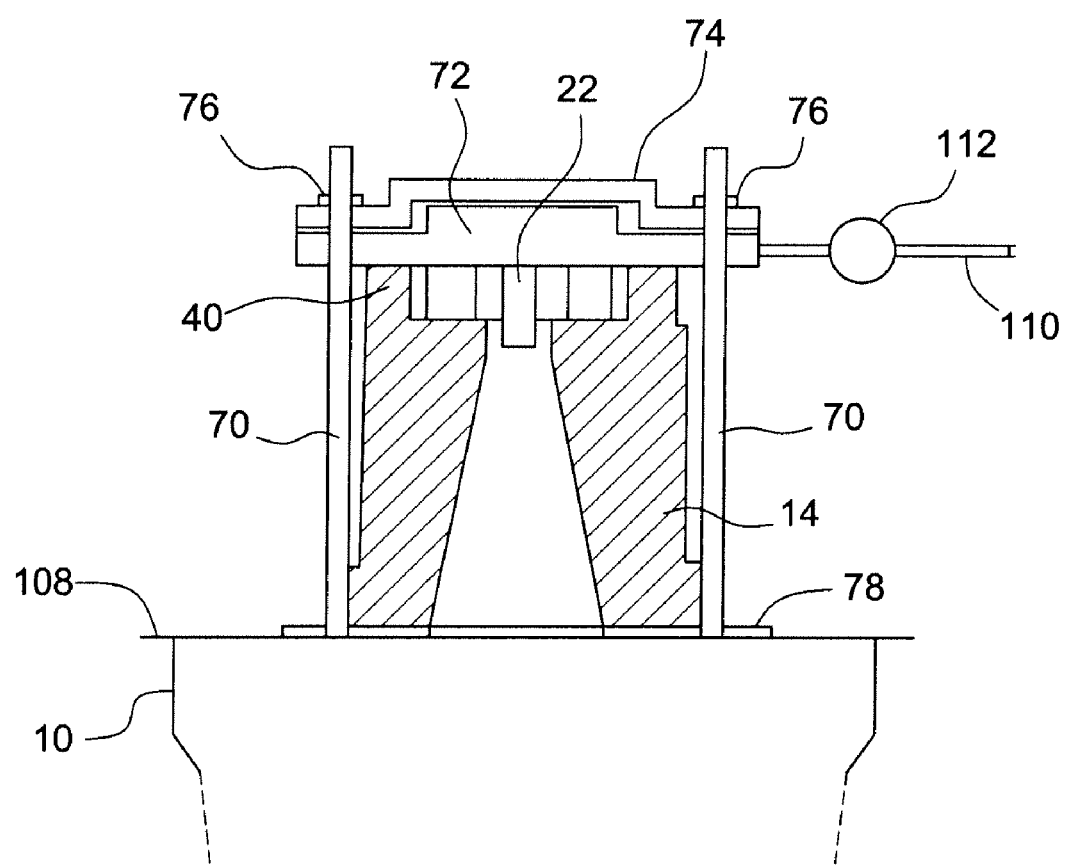
FIG. 17 shows a schematic sectional view of another embodiment of the invention.

FIG. 17 shows a schematic sectional view of another embodiment of a system of the invention. The end of the reformer 10 facing the nozzle 14 is shown. The reformer 10 is bordered by the heat shield 108. On this heat shield 108 there are two mounting pins 70. These mounting pins 70 can be welded to the heat shield 108 or the reformer 10. The mounting pins 70 define the positioning of the other components described below. First of all, there is a seal 78 which preferably includes a mica layer and a graphite layer, the mica layer being turned toward the reformer 10 and the graphite layer being turned toward the nozzle 14. A ceramic nozzle 14 follows which sits with its recesses 88 shown in FIG. 16 on the mounting pins 70. A fuel feed 72 which is connected to the fuel needle 22 is seated on the nozzle 14. This fuel feed 72 is likewise positioned by the mounting pins 70. The fuel feed 72 is supplied with fuel by the fuel line 110 in which the fuel sensor 112 is located. The fuel feed 72 is followed by a spring 74 which is likewise seated on the mounting pins 70. The spring 74 is held by clamping disks 76 which sit immovably on the mounting pins 70. The spring 74 is shown in the tensioned state in which the legs of the spring 74 are parallel to the disks. In the released state of the spring 74, the legs of the spring 74 are bent upward in the direction towards the interposed disk. A glow pin (not shown) is positioned, in accordance with the embodiment of a nozzle 14 shown in FIG. 15, and is held by a wire spring (not shown) which is supported on the nozzle 14.

In this construction, the fuel feed 72 and the fuel needle 22 are automatically aligned with respect to the nozzle 14. Therefore, only two components are involved which influence the fuel feed and the mixing of the fuel with combustion air so that very low tolerances can be maintained. This is made possible by the installation on the mounting pins 70. Likewise, the glow pin can be positioned exactly with respect to the nozzle 14 and the reformer 10.

The production of the structure shown in FIG. 17 can be fully automated. In particular, the installation direction is uniformly axial so that only "threading" of the parts must be carried out. The seal 78 provides thermal insulation, coupling of the nozzle ceramic 14 to the metal of the heat shield 108 and tolerance equalization. The structure can be advantageously mounted by power-controlled pressing of the clamp disks 76 onto the mounting pins 70 such that with respect to the heat and temperature properties of the structure uniform tolerances can be obtained. As a result of the spring force, the tolerances as a result of different heating of the components, different final temperatures of the components and different coefficients of temperature expansion can be equalized.

The features disclosed in the specification above, in the drawings and in the claims can be important both individually and also in any combination for the implementation of the invention.

What is claimed is:

1. Device for converting fuel and air into reformate comprising
   a reformer which includes a reaction space,
   a nozzle for supplying a fuel/air mixture to the reaction space,
   a fuel feed for supplying fuel to the nozzle, and
   at least one heating element for igniting the fuel/air mixture,
   wherein a breaker body is provided within the reaction space in the path of the fuel/air mixture supplied from the nozzle; wherein outside dimensions of the breaker body are smaller than inside dimensions of an area of the reaction space in which the breaker body is positioned, a geometry of the reaction space and of the breaker body relative to each other being such that at least part of the fuel/air mixture is able to flow around and beyond the breaker body, and wherein the breaker body is formed of a baffle plate that is generally pot-shaped at least in part and wherein an annular wall having outside dimensions that are smaller than inside dimensions of the baffle plate defines an ignition chamber in which said at least one heating element is positioned and extends from an inner wall of the pot-shape part of the baffle plate beyond the baffle plate into the reaction space, the ignition chamber being peripherally separated from the reaction space by a separate annular wall from that which forms the pot-shape of the breaker body.

2. A device as claimed in claim 1, wherein the breaker body is located in the exit direction of the fuel/air mixture relative to the nozzle.

3. A device as claimed in claim 1, wherein the reaction space is operable as a burner that has a flame zone therein; and wherein the breaker body is located in the area of the flame zone of the reaction space.

4. A device as claimed in claim 1, wherein part of the breaker body has a conical and/or convex and/or concave shape.

5. A device as claimed in claim 1, wherein the breaker body is circular in shape and the ratio of the breaker body diameter relative to a reaction space diameter is 0.6-0.9.

6. A device as claimed in claim 1, wherein a supply of air to the nozzle is arranged to produce atomization of the fuel/air mixture at an atomization point near an outlet of the nozzle; and wherein a ratio of an axial distance of the breaker body from the atomization point of the fuel/air mixture to a reaction space diameter is between 0.3 and 0.6.

7. A device as claimed in claim 1, wherein the breaker body has openings formed therein in the form of at least one of holes and slots.

8. A device as claimed in claim 1, wherein the breaker body has at least one partially ring-shaped section.

9. A device as claimed in claim 1, wherein the at least one heating element is selected from either a glow pin or a glow plug.

10. A device as claimed in claim 1, wherein the breaker body is mounted directly in the reaction space or mounted indirectly in the reaction space via mounting clips.

11. A device as claimed in claim 1, wherein the breaker body is constructed at least in part of either steel, ceramic or ceramic-coated steel.

12. A device as claimed in claim 1, wherein the nozzle further includes an air guidance means in an air inlet area of the nozzle which imparts a swirl to the in-flowing air.

13. A device as claimed in claim 1, wherein the nozzle is a Venturi nozzle having an air inlet region and a diffuser region which extends downstream with respect to the air inlet region.

* * * * *